United States Patent Office 3,332,465
Patented July 25, 1967

3,332,465
PNEUMATIC TIRES
Tom French, Sutton Coldfield, England, assignor, by mesne assignments, to Dunlop Tire and Rubber Corporation, Buffalo, N.Y., a corporation of New York
Filed Apr. 2, 1965, Ser. No. 445,047
Claims priority, application Great Britain, Apr. 21, 1964, 16,415/64
13 Claims. (Cl. 152—209)

This invention relates to pneumatic tires and more particularly to treads for pneumatic tires.

Great difficulty has been experienced in the removal by pneumatic tires of water lying upon a road surface. Pneumatic tire braking and driving forces are transmitted through a flattened area of the tire in contact with the ground and while under normal low speed, dry road conditions, the whole of the contact area is effective for the transmission of these forces, a proportion of the contact area becomes ineffective under wet road conditions at speed since it is isolated from the road surface by a film of water. The difficulty is greatly accentuated when the vehicle travels through the water at high speed, for example at 60 m.p.h. or more, and the greater the speed of the vehicle, the smaller the effective contact area of each tire with the ground since the vehicle tends to ride over the water. At a certain minimum speed depending upon the weight of the vehicle, the tires with which it is fitted, the tire inflation pressure, and the amount of water lying upon the road surface, the tires will ride completely over the water and be isolated from the road surface by a water film. This has become known as "vehicle aquaplaning."

It will be appreciated, therefore, that the length of the effective contact area of tire tread with the ground for each tire becomes shorter with increasing speed and that, at the same time, there is a reduced duration during which water can be removed prior to the establishment of effective road contact, e.g. at 60 m.p.h. the duration of time of any part of the tread in the whole of the contact area, part of which, as will be appreciated is ineffective, is approximately 0.007 second.

It is therefore imperative to remove water from the road surface, prior to and in the contact area, with the greatest possible speed and this has been achieved, in the past, by physical displacement of water by the tire, after the manner of a bow wave created by a boat, and by the provision of circumferential drainage grooves, but these are not sufficiently effective at high speed to avoid serious loss of grip or aquaplaning.

Narrow slots formed in the tread rubber and extending radially inwardly from the road contact surface have, in earlier tire constructions, been moulded in the tread by thin blades attached to the tread moulding surface. This is in contrast to previously known tires provided with cuts, wherein substantially no rubber is removed from the tread and wherein the opposed faces of the cuts are in contact. The provision of these narrow slots, hereinafter referred to as "slots," has been in the past, to provide resistance to skidding and, in known tire constructions, the spacing apart of the slots has been quite wide.

It has been discovered, however, that the provision of slots is of considerable value, not only for skid resistance but also by virtue of the fact that the slots operate as local reservoirs which have the function of soaking-up water from the portion of contact area of the tire tread closely adjacent and surrounding the slot.

The concentration of spacing of the slots is found to be of prime importance in view of the fact that, as already stated, the duration of dwell of any given portion of the tread surface in the contact area is extremely short at speed and there is no time available for the conveyance of a local accumulation of water other than for a very short distance. The quicker the water is removed into a slot reservoir the more time there is for the establishment of a dry contact area of adequate size and thus a contact area providing safety for both braking and driving action through the tires fitted to the vehicles.

It is an object of the present invention to provide an improved form of pneumatic tire which will give an increased resistance to the aquaplaning effect described above.

According to the invention there is provided a pneumatic tire having a tread portion, the ground-contacting surface of which is provided with at least one generally circumferential rib and generally circumferential grooves one on each side of the rib, the rib having a plurality of slots provided therein, the mean concentration of spacing of the slots around the circumference of the rib being such that a length of at least 7.5 inches of slot is provided on the ground-contacting surface per square inch of said surface.

Preferably the slots extend in depth for substantially between one-half to the whole of the depth of the circumferential grooves, preferably for substantially 90% of said depth, and thus have high water retaining capacity. The means width of the slots may be small e.g. about 0.010 inch, account being taken of the fact that the slots will open up in the contact patch to operate as reservoirs, or may have a moulded width of up to, e.g. 0.050 inch.

Preferably each slot is of zig-zag formation in plan view, and may be of three-leg zig-zag shape, with the length of the legs of each zig-zag slot being varied and said varied lengths of slot being randomly arranged together.

One form of pneumatic tire constructed in accordance with the invention will now be described in more detail with reference to the accompanying drawings wherein.

Figure 1:
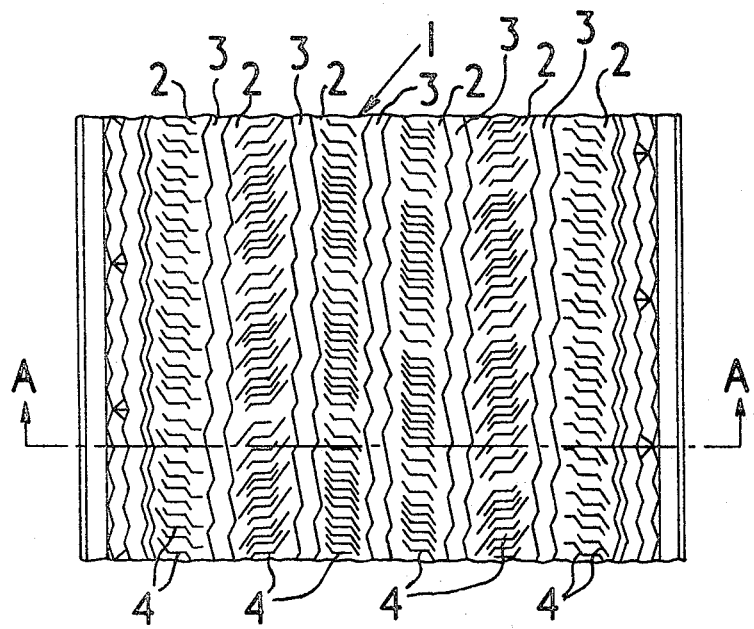
FIGURE 1 is a plan view of a part of the tread of a pneumatic tire.
Figure 2:
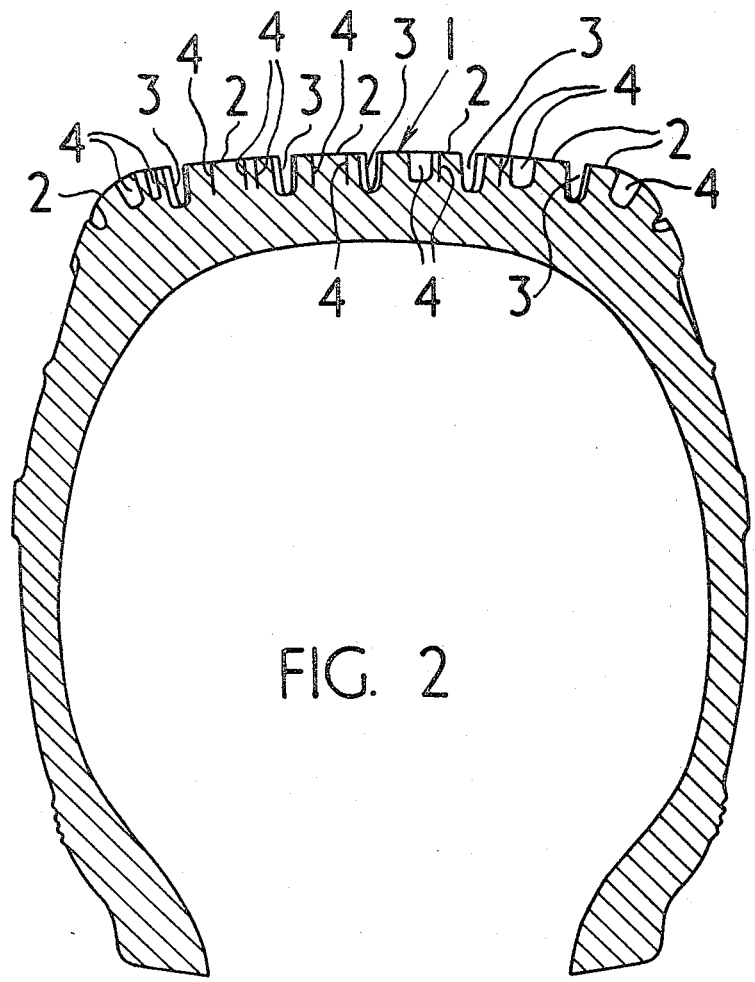
FIGURE 2 is a cross-sectional view through the tire on the line A—A of FIGURE 1.

A motor car pneumatic tire tread 1 is provided with six generally circumferentially-extending ribs 2, and five generally circumferential grooves 3 located one between each pair of ribs. The walls of the grooves 3 are, in plan view of the tread, of zig-zag formation, as is clearly shown in FIGURE 1, opposite walls in each groove having parallel faces so that the width of the grooves is substantially constant.

On the ground-contacting face of each rib 2 there is provided a plurality of slots 4, moulded into the tread by means of .013 of an inch thick knife blades secured to the mould matrix used in producing the tread pattern. Each of the slots extends to a depth substantially equal to the depth of the grooves 3, i.e., 92% of the said depth, and the majority of the slots are of three-leg zig-zag shape in plan view. The opposed side walls of each slot are substantially parallel so that the width of each slot is substantially constant and the length of the legs of each zig-zag slot are varied, the varied lengths of slot being randomly arranged together with a view to decreasing the amount of objectionable road noise set up by the tire during running from that which would be obtained by a regular arrangement. None of the slots 4 extend into the circumferential grooves 3.

The mean concentration of spacing of the slots around the circumference of each rib is such that a length of 8 inches of slot, measured along the limbs of the zig-zag on the ground contacting surface of the tire tread, is provided per square inch of rib ground-contacting surface.

In operation of the tire, when it is driven at high speed, i.e. 90 m.p.h. through standing water on a road surface, the leading edge of the tire, just prior, in the sense of tire rotation, to the contact area, physically displaces a certain volume of water from the road surface next to be rolled upon by the tire. This is a preliminary water removal stage, the next stage being the action of riding over the film of water remaining, by the leading portion of the contact area of the tire, so that the effective contact area is reduced. During this stage, and later, water is displaced by the tire transversely into the circumferential grooves 3 which act as water conduits.

The tire described, however, in contrast to tires which are commonly used, is provided with the slots 4 which operate as local reservoirs to soak-up the remaining film of water in the path of the rolling tires and the concentration of spacing of the slots is such that the effective contact area is not further reduced and is adequate to provide safe handling of the vehicle to which the tire is fitted during braking and cornering. When the portion of the tire in the contact area rolls clear, the water in the grooves and slots is thrown clear by the centrifugal action of the rotating tire.

Although the present invention has been illustrated and described in connection with a few selected example embodiments, it will be understood that these are illustrative of the invention and are by no means restrictive thereof. It is reasonably to be expected that those skilled in the art can make numerous revisions and adaptations of the present invention and it is intended that such revisions and adaptations will be included within the scope of the following claims as equivalents of the invention.

Having now described my invention, what I claim is:

1. A pneumatic tire having a tread portion with a ground-contacting surface formed thereon, at least one generally circumferential rib formed on said ground-contacting surface and having generally circumferential grooves formed therein one on each side of the rib, said rib having a plurality of liquid-receiving slots molded therein and wherein the mean concentration of spacing of the slots around the circumference of the rib provides slots which are formed by voids in the rib material proportioned to maintain a clearance of sufficient proportions to provide a liquid-receiving reservoir and having a length of at least 7.5 inches of slots on the ground-contacting surface of the rib per square inch of said rib surface, said liquid-receiving slots being constructed and arranged whereby during rotation of the tire upon a liquid covered surface, liquid is received by such slots in the contact area of the rib with said liquid-covered surface to effect a substantially dry contact area.

2. A pneumatic tire as claimed in claim 1, wherein the mean concentration of spacing of the slots around the circumference of the rib is such that a length of 8 inches of slot is provided on the ground-contacting surface per square inch of said surface.

3. A pneumatic tire as claimed in claim 1, wherein the slots extend in depth for between one half and the whole of the depth of the circumferential grooves.

4. A pneumatic tire as claimed in claim 1, wherein the slots extend in depth for substantially 90% of the depth of the circumferential grooves.

5. A pneumatic tire as claimed in claim 1, wherein the opposed side walls of each slot are substantially parallel so that the width of each slot is substantially constant.

6. A pneumatic tire as claimed in claim 1, wherein the width of the slots lies within the range of 0.010 inch to 0.050 inch.

7. A pneumatic tire as claimed in claim 1, wherein the width of the slots is 0.013 inch.

8. A pneumatic tire as claimed in claim 1, wherein each groove is of zig-zag formation in plan view and the width of each groove is substantially constant.

9. A pneumatic tire as claimed in claim 1, wherein six circumferentially extending ribs are provided in the tread portion.

10. A pneumatic tire as claimed in claim 1, wherein each slot is of zig-zag formation in plan view.

11. A pneumatic tire as claimed in claim 10, wherein each slot is of three-leg zig-zag formation in plan view.

12. A pneumatic tire as claimed in claim 11, wherein the lengths of the legs of each zig-zag slot are varied and said varied lengths of slots are randomly arranged.

13. A pneumatic tire as claimed in claim 1, wherein none of the slots extend into the circumferential grooves.

References Cited

UNITED STATES PATENTS

| 2,240,542 | 5/1941 | Bourdon | 152—229 |
| 2,261,025 | 10/1941 | Havens | 152—209 |
| 2,779,060 | 1/1957 | Knox | 152—209 |

FOREIGN PATENTS 802,268  10/1958  Great Britain.

ARTHUR L. LA POINT, *Primary Examiner.*

C. W. HAEFELE, *Assistant Examiner.*